United States Patent
Zidovec

(10) Patent No.: US 6,620,328 B2
(45) Date of Patent: Sep. 16, 2003

(54) CONTROL OF BARIUM SULFATE SCALING

(75) Inventor: Davor F. Zidovec, Jacksonville, FL (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/117,014

(22) Filed: Apr. 5, 2002

(65) Prior Publication Data

US 2002/0153506 A1 Oct. 24, 2002

Related U.S. Application Data

(62) Division of application No. 09/630,183, filed on Aug. 1, 2000, now abandoned.

(51) Int. Cl.$^7$ .................................................. C02F 5/14
(52) U.S. Cl. .................. 210/697; 210/699; 210/701; 252/181
(58) Field of Search ........................ 210/697, 699, 210/698, 701; 252/179, 181

(56) References Cited

U.S. PATENT DOCUMENTS

| | | | | |
|---|---|---|---|---|
| 3,476,689 A | * | 11/1969 | Newman | 252/175 |
| 4,640,793 A | * | 2/1987 | Persinski et al. | 252/181 |
| 4,693,829 A | * | 9/1987 | Boffardi | 210/697 |
| 5,059,333 A | * | 10/1991 | Hen | 166/279 |
| 5,256,253 A | * | 10/1993 | Zidovec et al. | 162/164.6 |
| 5,368,740 A | * | 11/1994 | Zidovec et al. | 162/38 |
| 5,401,419 A | * | 3/1995 | Kocib | 210/697 |
| 5,468,393 A | * | 11/1995 | Zidovec et al. | 162/38 |
| 5,658,464 A | * | 8/1997 | Hann et al. | 252/181 |

* cited by examiner

Primary Examiner—Daniel S. Metzmaier
(74) Attorney, Agent, or Firm—David L. Hedden

(57) ABSTRACT

This invention relates to a method of inhibiting the growth of barium sulfate scaling by using a synergistic blend of (a) a polyphosphate with degree of polymerization between 6 and 21, and (b) a polyphosphate with degree of polymerization of 2–3 in a weight ratio of 3:1 to 1:2. The blend further includes a phosphino-acrylic polymer.

3 Claims, No Drawings

CONTROL OF BARIUM SULFATE SCALING

This application is a division of application Ser. No. 09/630,183 filed on Aug. 1, 2000, now abandoned

FIELD OF THE INVENTION

This invention relates to a method of inhibiting the growth of barium sulfate scaling by using a blend of (a) a polyphosphate with degree of polymerization between 6 and 21, and (b) a polyphosphate with degree of polymerization of 2–3.

BACKGROUND OF THE INVENTION

Barium sulfate scaling is a problem encountered in several industrial processes, in particular papermaking, mining, and oil production. Barium and/or sulfate is found in wood, alum, and/or water (fresh, well, and seawater) that may be used in one or more of these manufacturing processes. A variety of scale inhibitors is used to reduce the incidence of barium sulfate scaling. The most effective among them are polyepoxysuccinic acid (see U.S. Pat. Nos. 5,062,962 and 5,368,740), polyvinylsulfonate (see U.S. Pat. No. 4,710,303) or other sulfonate containing polymers, and polyphosphates such as those shown in U.S. Pat. No. 5,468,393, which is hereby incorporated by reference.

These chemicals are more or less effective, depending on the severity of scaling conditions and presence of interfering ions such as $H^+$ at low pH or polyvalent metals. In some cases the available chemicals are of only marginal efficacy and thus new inhibitor formulations with improved performance are desirable.

SUMMARY OF THE INVENTION

This invention relates to scale inhibiting compositions comprising:

(a) a polyphosphate with degree of polymerization between 6 and 21, and (b) a polyphosphate with degree of polymerization 2–3. Preferably a phosphino-polyacrylate is added to the composition.

The blends are particularly effective at inhibiting barium sulfate scale and provide economic advantages. Although (a) alone is an effective barium sulfate scale inhibitor, it is more expensive than (b), which is not effective alone as a barium sulfate scale inhibitor. It was unexpected that the blend, containing significant amounts of (b), would work as effectively as (a) alone. The 50/50 blend is particularly advantageous and exhibits synergism. The blends are more cost effective than using (a) alone. The invention also relates to a process for inhibiting barium sulfate scale in an open system subject to evaporation.

BEST MODE AND OTHER MODES

One of the polyphosphates, component (a), used in the scale inhibiting compositions, is a polyphosphate having a degree of polymerization between 6 and 21. Examples of such polyphosphates are sodium and potassium salts of hexamethaphosphate, preferably the sodium salts. The other polyphosphate, component (b), has a degree of polymerization of 2–3. Examples of such polyphosphates are sodium or potassium salts of tripolyphosphate or pyrophosphate. The polyphosphates are commercially available from FMC as Sodaphos, Hexaphos, and Glass H.

Barium sulfate scale inhibition is further improved by the addition of a polyacrylate scale inhibitor to the blend. Suitable polyacrylate scale inhibitors have an average molecular weight ranging from to 500 to 10,000. Suitable polyacrylate inhibitors include homopolymers and copolymers containing derived from monomers having alpha, beta-ethylenically unsaturated linkages such as acrylic acid, methacrylic acid, diacids such as maleic acid, and the like. When the inhibitor is a copolymer, the other component monomers can be any alpha, beta-ethylenically unsaturated monomer with either a non-polar group such as styrene or olefinic monomers, or a polar vinyl functional group such as acrylamide or acrylamide derivatives, styrenesulfonic acid, and 2-acrylamido-2-methylpropanesulfonic acid (AMPS).

Preferably, the polyacrylate inhibitor is a phosphino-polyacrylic acid, a modified polyacrylate. These products are sold under the tradename "Belsperse 161" or "Belasol S-29" by Ciba Geigy. Particularly preferred are phosphino-polyacrylic acid having an average molecular weight of 3000 to 4000.

Typically, the effective concentration of the polyacrylate inhibitor ranges from 0.05 to 50 ppm, preferably 0.5 to 10 ppm in treated water.

Preferably, a polyacrylate, containing phosphino linkages in its backbone, is added to the composition to further inhibit barium sulfate scaling. An example of such polyacrylates is Belsperse 161, having an average molecular weight of 2,800 to 3,800, sold by FMC.

Optional components, e.g. azoles, surfactants, dispersants, etc. may provide additional benefits in a finished product, but do not affect barium sulfate growth.

The optimum ratio of (a) and (b) depends on the composition of the liquid stream, in particular the concentration of $Al^{+3}$ and other polyphosphate binding metal ions. The weight ratio of actives in (a) to (b) is typically from 1:9 to 9:1, preferably from 1:9 to 3:1, more preferably from 1:2 to 2:1, and most preferably about 1:1, based upon the total weight of (a) and (b). The solids content of (a) plus (b) is typically from 1 to 25 weight percent based upon the total weight of (a) and (b). These formulations are used in amounts of 1 to 50 ppm in acidic paper machines or open cooling water systems, preferably in amounts of 5 to 25 ppm.

| ABBREVIATIONS | |
|---|---|
| SHMP | sodium hexametaphosphate. |
| STPP | sodium tripolyphosphate. |
| PPA | phosphino-acrylic copolymer described by the following chemical structure: |

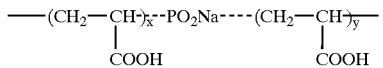

where x + y ranges from 10 to 100.

EXAMPLE

The examples illustrate specific embodiments of the invention. They are not presented to limit the application of this invention. It is contemplated that other embodiments will be useful. The water used in the examples is described in the Table I that follows.

TABLE I (Test Water)

| Water conditions | Concentration |
|---|---|
| Sulfates as $SO_4$ | 1300 ppm |
| Barium as Ba | 20 ppm |
| Calcium as $CaCO_3$ | 100 ppm |
| Aluminum as Al | 3 ppm |
| pH | 5.0 |
| Temperature | 60° C. |

SCALE INHIBITING TEST PROCEDURE

A dynamic scale-inhibiting test was utilized to test the effect of various compositions on inhibiting barium sulfate scale. This test correlates the pressure increase in a capillary stainless steel column, through which the test water flows, to an increase in barium sulfate scale build-up over time. Increases in pressure in the column of capillary stainless steel tube indicate that scaling is increased. A minimum dose of scale inhibitor chemical necessary to produce no detectable pressure increase was determined for SHMP, STPP and blends of SHMP and STPP. If lesser amount of chemicals were required to prevent barium sulfate scale, then the chemical is considered to be more effective at inhibiting barium sulfate scale. The effectiveness of the chemicals added to the aqueous system is a function of the slope of a graph plotting pressure along the "y" axis and increase versus time along the "x" axis. This plot is used to calculate barium sulfate inhibition.[1]

[1]% Inhibition (slope)=[{slope (untreated)–slope (treated)}÷slope (untreated)]×100.

EXAMPLES 1–3

Various waters are tested as indicated. The dosage of the scale inhibitor is set forth in Table I in ppm. The results of this test are set forth in TABLE I. Examples A–D are comparison examples.

TABLE II

SCALE INHIBITING TEST DATA

| Example | Additive | Dose (ppm) | SHMP/STPP RATIO | % Ba Inhibition |
|---|---|---|---|---|
| Control (test water) | — | 0 | N/A | 0 |
| A | SHMP | 14 | N/A | 80 |
| B | SHMP | 17 | N/A | 100 |
| C | STPP | 30 | N/A | 85 |
| D | STPP | 37.5 | N/A | 100 |
| 1 | SHMP/STPP | 15 + 5 | 3 | 100 |
| 2 | SHMP/STPP | 7 + 7 | 1 | 100 |
| 3 | SHMP/STPP | 4.6 + 13.8 | 0.33 | 77 |

[1]% Inhibition (slope) = [{slope (untreated) – slope (treated)} ÷ slope (untreated)] × 100.

The data show that STPP is a weak and insufficient barium sulfate scale inhibitor when used alone and that SHMP is an effective barium sulfate scale inhibitor when used alone. Thirty parts of STTP were needed to get 85% barium sulfate inhibition, while 37.5 ppm were needed to reach complete inhibition (100%). On the other hand, only 14 ppm of SHMP were needed to achieve 80% barium sulfate inhibition, while 100% was reached with 17 ppm of SHMP. Thus more than twice as much STPP was needed, compared to the amount of SHMP, to get approximately the same amount of barium sulfate scale.

However, the data show that if STPP is blended with SHMP, the blend can achieve performance levels equivalent to that of SHMP if SHMP is used alone. The blends are not only effective at inhibiting barium sulfate scale, but they do this more economically, since SHMP is more expensive to use than STTP. The results shown for the blend of Example 2 is particularly unexpected and synergistic because the weight ratio of SHMP/STPP is 1:1, yet the total amount of the blend needed to get 100% barium sulfate inhibition is only 14 parts, which is the same amount required for SHMP to achieve 80% barium sulfate inhibition when used alone.

EXAMPLE 4

(Illustrates Addition of PPA)

Examples E, F, and 4 show the effect of adding PPA to the blend of Example 2. The results are shown in Table III.[2] Examples E and F are comparison examples.

[2]The test column undergoes a series of cycles of scaling followed by washes with dilute nitric acid. In the case of barium sulfate, this causes the response to change slowly with time. A group of tests is comparable if done within a short time frame. That is why there are some differences in the data in Table III when compared to the data in Table II and III. Thus, the results in Table II and III are not comparable, since the column is not the same.

TABLE III (VARIOUS AMOUNTS OF PPA)

| Example | AMOUNT OF PPA | % Ba Inhibition |
|---|---|---|
| E | UNTREATED | 0 |
| F | 7 ppm SHMP + 7 ppm STPP | 45 |
| 4 | 7 ppm SHMP + 7 ppm STPP + 5 ppm PPA | 81 |

The data in Table III show that the addition of PPA improves the blend of SHMP/STPP ability to inhibit the formation of barium sulfate scale.

I claim:

1. A process for inhibiting the formation of barium sulfate scale on a metal surface in an open cooling water system containing barium comprising:

introducing a barium sulfate scale inhibiting compositions into an open cooling water system containing barium, which comes into contact with a metal surface subject to the formation of barium sulfate scale, wherein said barium scale inhibition composition comprises:
   (a) sodium hexametaphosphate, and
   (b) sodium tripolyphosphate, wherein the weight ratio of (a) to (b) is from 3:1 to 1:2, and a phosphino-acrylic polymer, into said open cooling system in an amount effective to inhibit the formation of scale.

2. The method of claim 1 wherein said composition is used in concentration of from about 1 ppm to about 10,000 ppm.

3. The method of claim 2 wherein said composition is used in concentration of from about 5 ppm to about 50 ppm.

* * * * *